(12) United States Patent
Haga et al.

(10) Patent No.: US 7,899,287 B2
(45) Date of Patent: Mar. 1, 2011

(54) OPTICAL BRANCHING-COUPLING DEVICE, AND MANUFACTURING METHOD AND OPTICAL MODULE OF THE SAME

(75) Inventors: Kenji Haga, Aichi (JP); Yukitoshi Inui, Aichi (JP); Kazuhiro Terada, Aichi (JP); Akiko Okita, Aichi (JP); Masaaki Tsuchimori, Nagoya (JP); Akari Nakao, Nagoya (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 0 days.

(21) Appl. No.: 12/457,939

(22) Filed: Jun. 25, 2009

(65) Prior Publication Data
US 2009/0324172 A1    Dec. 31, 2009

(30) Foreign Application Priority Data
Jun. 27, 2008    (JP) .................. 2008-169004

(51) Int. Cl.
*G02B 6/26*    (2006.01)
(52) U.S. Cl. .......................................... 385/45
(58) Field of Classification Search .............. 385/45, 385/129–132
See application file for complete search history.

(56) References Cited

U.S. PATENT DOCUMENTS

| | | | | |
|---|---|---|---|---|
| 4,984,868 A | * | 1/1991 | ten Berge .................. | 385/58 |
| 5,030,321 A | * | 7/1991 | Coutandin et al. ........ | 216/24 |
| 5,410,627 A | * | 4/1995 | Hultermans ............... | 385/45 |
| 5,537,497 A | * | 7/1996 | Nelson ...................... | 385/22 |
| 5,761,353 A | * | 6/1998 | Van Der Tol et al. ..... | 385/16 |
| 5,781,678 A | * | 7/1998 | Sano et al. ................. | 385/45 |
| 6,925,233 B2 | * | 8/2005 | Inui et al. .................. | 385/39 |
| 7,099,539 B1 | * | 8/2006 | Au et al. ..................... | 385/39 |
| 2002/0186935 A1 | | 12/2002 | Inui et al. | |

FOREIGN PATENT DOCUMENTS

| | | |
|---|---|---|
| JP | 2002-169038 A | 6/2002 |
| JP | 2002-365459 A | 12/2002 |
| JP | 2004-149579 A | 5/2004 |
| JP | 2005-347441 A | 12/2005 |

* cited by examiner

*Primary Examiner* — Charlie Peng
(74) *Attorney, Agent, or Firm* — McGinn IP Law Group, PLLC (57) ABSTRACT

The optical branching-coupling device having a self-written optical waveguide core is formed without using half mirrors. In the optical branching-coupling device, three POFs are inserted into a housing having an approximately D-shaped sidewall. An approximately semi-columnar region V in the housing was filled with an uncured liquid light-curing acrylic resin. A laser beam was introduced from one of the POFs, and a cured material was formed of the end face of the POF. The diameter was equal to the core diameter of the POF. The cured material grew, resulting in the cured material reaching the end face of another one of the POFs, thereby forming an optical waveguide core. Next, a laser beam was introduced from the end face of the last one of the POFs. The cured material grew, resulting in a connection with the optical waveguide core, thereby forming the optical waveguide core.

8 Claims, 5 Drawing Sheets

PRIOR ART

OPTICAL BRANCHING-COUPLING DEVICE, AND MANUFACTURING METHOD AND OPTICAL MODULE OF THE SAME

BACKGROUND OF THE INVENTION

1. Field of the Invention

The present invention relates to an optical branching-coupling device usable as an optical branching device and an optical coupling device, and an optical module containing the same, and a manufacturing method of an optical branching-coupling device.

2. Description of the Related Art

In optical communication, optical branching-coupling devices and optical modules containing an optical branching-coupling device and a light emitting device and a light receiving device have a crucial role. For example, in single wire bidirectional optical communication, an optical branching and coupling device which branches and couples an optical waveguide for propagating the light emitted from a light emitting device such as an LED, an LD, or the like and an optical waveguide for propagating the transmitted light to a light receiving device such as PD is required at input-output terminal of the system. Meanwhile, the applicants of the present application have developed a number of self-written optical waveguides having a long axial core which is formed by using s self focusing caused in a curing resin when light-curing resin liquid is irradiated with light from an optical fiber or the like. And the applicants filed patents on such waveguides, some of which are disclosed in Japanese patent No. 4011283 and Japanese Unexamined Patent Application Publication Nos. 2002-365459, 2004-149579, and 2005-347441. At that time, the applicants also proposed that as an optical branching-coupling device or an optical multiplexer-demultiplexer device used in a single wire bidirectional optical communication, a branched core be formed of the above-mentioned self-written optical waveguide which is branched by a half mirror or a wavelength selective mirror. This suggests that an optical module having a light emitting device and a light receiving device may be easily formed.

Figure 6:
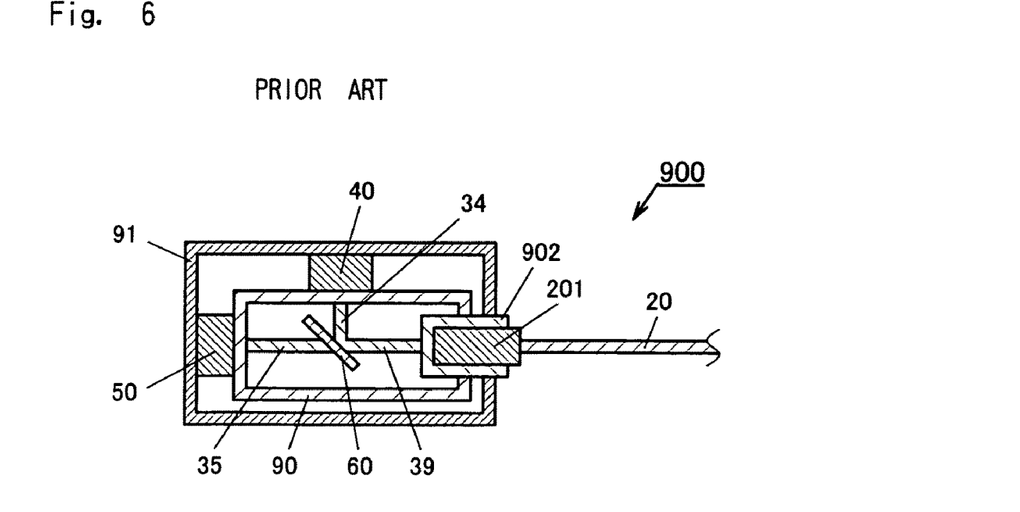
FIG. 6 is a plan view illustrating an example of the structure of the optical module 900 according to the related art.

An example of the structure of an optical module employing a self-written optical waveguide will be simply described below. FIG. 6 is a schematic diagram of an optical module 900 employing a self-written optical waveguide. The optical module 900 has a transparent housing 90, a photodiode (PD) 40, a light emitting diode (LED) 50 and a receptacle 902, and an external housing 91 covering these elements. The receptacle 902 is connected with a plastic optical fiber (POF) 20 through a connector 201. The transparent housing 90 has a half mirror 60 and three optical waveguide cores 39, 34, and 35 which form a branch by using a half mirror 60. The optical waveguide core 39 is optically connected with the receptacle 902 and the half mirror 60. The optical waveguide core 34 is optically connected with the PD 40 and the half mirror 60. The optical waveguide core 35 is optically connected with the LED 50 and the half mirror 60. In this structure of the optical module 900, an optical signal from an external optical line is input through the POF 20, passes through the connector 201, the receptacle 902, and the optical waveguide core 39 in that order; and is reflected by the half mirror 60, passes through the passing optical waveguide core 34; and then is introduced to the PD 40. Meanwhile, an optical signal from the LED 50, passes through the optical waveguide core 35, is transmitted by the half mirror 60; passes through the optical waveguide core 39, the receptacle 902, and the connector 201 in that order, and is output to the external optical line through the POF 20.

When the branched core is formed of the above-mentioned self-written optical waveguide in which a half mirror is utilized, optical branching or optical coupling is not always ideally conducted in the branching part. For example, in the optical module 900 of FIG. 6, the half mirror 60 with a reflectance of 50% and a transmittance of 50% used for arbitrary wavelengths invariably causes a loss of 3 dB of light received from the external optical line. After the addition of the loss occurring in the optical waveguide, specifically at a branching part due to other causes, to the loss occurring at the half mirror, the insertion loss of the optical branching-coupling device becomes about 6 dB.

The half mirror is typically produced by laminating a dielectric multilayer on a transparent substrate of glass or the like. Thus, the half mirror is expensive, causing the production cost of the optical branching-coupling device to be increased. In addition, the half mirror typically employs a substrate and a dielectric multilayer of inorganic material, which has weak adhesion to a light-curing resin which is an organic compound. For example, adding a thermal history to the optical branching-coupling device during a reliability test often causes detachment of the half mirror. This means that the detachment occurs even in practical usage with the lapse of time.

As described above, according to the related art, an optical branching-coupling device employs a half mirror, which has problems of the high insertion loss, high cost, and easy detachment of the half mirror from the optical waveguide. Then, the inventors of the present invention have deliberated on the production of an optical branching-coupling device in which no half mirrors are used, and completed the present invention.

SUMMARY OF THE INVENTION

Accordingly, it is an object of the present invention to provide an optical branching-coupling device with no half mirrors.

According to a first aspect of the present invention, an optical branching-coupling device having first, second, and third optical input-output ports connected with an optical waveguide, comprises:

a first optical waveguide with a straight optical axis connecting the first optical input-output port and the second optical input-output port, and a second optical waveguide with a straight optical axis directly connected to the first optical waveguide and connecting the first optical waveguide and the third optical input-output port, and wherein the angle between the optical axes of the first optical waveguide and the second optical waveguide is from 10 to 30 degrees.

Herein, the optical waveguide is distinguished from the core of the optical waveguide. The optical waveguide is capable of transmitting light through the core thereof due to the refractive index difference between the core and the surroundings thereof. The core of the optical waveguide may or may not be covered with a cladding material. An optical waveguide having a core not covered with a cladding material is one in which surroundings of the core is air or vacuum. The second optical waveguide directly connects third optical input-output port and the first optical waveguide. That means that at least the core of the second optical waveguide directly connects third optical input-output port and the first optical waveguide.

According to a second aspect of the present invention, both the cores of the first optical waveguide and the second optical waveguide consist of a cured material of the same light-curing resin. According to a third aspect of the present invention, the first, second, and third optical input-output ports are directly connected with the edges of the cores of three optical fibers, respectively.

According to a fourth aspect of the present invention, an optical module includes: the optical branching-coupling device according to the first aspect or the second aspect of the present invention, a receptacle capable of connecting to an optical fiber by using a connector, which is provided at the first optical input-output port; a light receiving device (element) provided at the second optical input-output port; and a light receiving device (element) provided at the third optical input-output port. The light receiving device or the light emitting device is provided the optical input-output port. That means that the optical input-output port is optically connected, but not necessarily limited to be directly connected, with the light receiving device or the light emitting device. For example, the optical module having an optical input-output port opposed to the light receiving device or the light emitting device with a transparent material to light of the wavelength being used that is disposed therebetween is within the scope of the fourth aspect of the present invention.

According to a fifth aspect of the present invention, a method of producing the optical branching-coupling device according to the first aspect or the second aspect of the present invention includes: disposing an uncured liquid light-curing resin; forming a core of the first optical waveguide by radiating curing light of a wavelength capable of curing the liquid light-curing resin from the first optical input-output port to the second optical input-output port and/or from the second optical input-output port to the first optical input-output port; and forming the core of the second optical waveguide so as to be directly connected with the core of the first optical waveguide by radiating curing light of a wavelength capable of curing the liquid light-curing resin from the third optical input-output port, at an angle of from 10 to 30 degrees relative to the optical axis of the designed first optical waveguide. According to a sixth aspect of the present invention, at the first, second, and third optical input-output ports, the edges of cores of three optical fibers are placed, and the curing light is radiated from the edges of at least two of the three optical fibers placed at the first, second, and third optical input-output ports.

The present invention is an optical branching-coupling device having cores of two optical waveguides connected without using half mirrors, in which the optical axes of the optical waveguides form an angle of from 10 to 30 degrees. This can be easily formed by a manufacturing technology of a self-written optical waveguide, as described below. If the angle formed by the optical axes of the axial (approximately columnar) cores of the two optical waveguides is less than 10 degrees, the connection part of the cores is long, and the second and the third optical input-output ports are not separated sufficiently. This causes difficulty in optical-axis alignment at the time of manufacturing and designing, and also excessively increases the size of the entire optical branching-coupling device, which is unpreferable. Meanwhile, if the angle formed by the optical axes of the axial (approximately columnar) cores of the two optical waveguides is greater than 30 degrees, the optical transmission loss between the first and the third optical input-output ports increases, which is unpreferable. This is because the incidence angle of the propagating light from the core of the second optical waveguide to the core of the first optical waveguide at the connection part or from the core of the first optical waveguide to the core of the second optical waveguide at the connection part excessively increases. The angle formed by the optical axes of the axial (approximately columnar) cores of the first and second optical waveguides is preferably 15 or more and less than 25 degrees.

According to the present invention, since the optical branching-coupling device can be manufactured without using half mirrors and the like which are costly, the component cost and the number of steps can be reduced and simplified, and the entire production cost can therefore be controlled. In addition, not using half mirrors and the like reduces the size of the space required to be provided at the vicinity of the branching part, so that the size of the entire device can be reduced. Furthermore, the number of inorganic materials to be used can be reduced, so that the possibility of detachment of the light-curing resin of the core and the like occurring can be reduced.

DESCRIPTION OF THE PREFERRED EMBODIMENTS

The optical waveguide of the present invention can be easily formed of a self-written optical waveguide. In this case, various techniques described in the above-mentioned patent documents can be used. In the optical branching-coupling device and the optical module, no cladding but only cores may be formed, which means that cladding may be formed of air around the cores. Any available light-curing resin liquids for forming a self-written optical waveguide are applicable. As curing mechanisms, any curing mechanism is applicable including radical polymerization, cationic polymerization, and other mechanisms. Generally, a laser beam is preferable as curing light. It is better to adjust the curing speed of a light curing resin liquid by means of the wavelength and intensity of the laser. Additionally, any available light curing initiator (photopolymerization initiator) is applicable in accordance with the light curing resin liquid and the wavelength of the laser. Regarding the above components, for example, the following are listed in Japanese Unexamined Patent Application Publication No. 2004-149579 in which the applicant of the present invention is a joint applicant.

To obtain a high refractive index, a monomer/oligomer containing at least one aromatic ring such as a phenyl group in a structural unit may be preferably used. On the other hand, to obtain a low refractive index, monomer/oligomer containing only an aliphatic system in the structural unit may be preferably used. To obtain the reduction in refractive index, part of hydrogen in a structural unit may be replaced by fluorine.

As a aliphatic system, polyhydric alcohols such as ethylene glycol, diethylene glycol, triethylene glycol, tetraethylene glycol, propylene glycol, dipropylene glycol, tripropylene glycol, tetrapropylene glycol, neopentyl glycol, 1,3-propanediol, 1,4-butanediol, 1,5-pentanediol, 1,6-hexanediol, trimethylolpropane, pentaerythritol, and dipentaerythritol may be listed.

As an aromatic system, various phenol compounds such as bisphenol A, bisphenol S, bisphenol Z, bisphenol F, novolac, o-cresol novolac, p-cresol novolac, and p-alkylphenol novolac may be listed.

In addition, compounds, in which the following functional groups and the like are introduced as a reactive group into the skeleton of these compounds or a relatively low molecular compound (with a molecular weight of about 3000 or less) having the structure of one or a plurality of oligomers (polyether) of polyhydric alcohols which are optionally selected from these compounds, may be used.

As a reaction group, the following functional group will be added to the above components.

[Radical Polymerization Material]

A photopolymerizable monomer and/or oligomer including one or more, preferably two or more ethylene-series unsaturated reactive group such as acryloyl group capable of radical polymerization in a structural unit. As an example of the monomer and/or oligomer including ethylene-series unsaturated reactive group, conjugate acid ester such as (meta)acrylic acid ester, itaconic acid ester, maleic acid ester may be listed.

[Cationic Polymerizable Material]

Photopolymerizable monomer and/or oligomer including one or more, preferably two or more reactive ether structures such as an oxirane ring (epoxide) capable of cationic polymerization and an oxetane ring in a structural unit. Incidentally, examples of the oxirane ring (epoxide) in the invention include an oxiranyl group, and a 3,4-epoxycyclohexyl group. Moreover, the oxetane ring is ether having a four-membered ring structure.

[Radical Polymerization Initiator]

A compound for activating a polymerization reaction of the radical polymerizable material containing a radical polymerizable monomer and/or oligomer using light is used as the radical polymerization initiator in the invention. Specific examples of the radical polymerization initiator include: benzoin compounds such as benzoin, benzoin methyl ether, and benzoin propyl ether; acetophenone compounds such as acetophenone, 2,2-dimethoxy-2-phenylacetophenone, 2,2-diethoxy-2-phenylacetophenone, 1,1-dichloroacetophenone, 1-hydroxycyclohexylphenylketone, 2-methyl-1-(4-(methylthio)phenyl)-2-morpholinopropane-1-one, and N,N-dimethylaminoacetophenone; anthraquinone compounds such as 2-methylanthraquinone, 1-chloroanthraquinone, and 2-amylanthraquinone; thioxanthone compounds such as 2,4-dimethylthioxanthone, 2,4-diethylthioxanthone, 2-chlorothioxanthone, and 2,4-diisopropylthioxanthone; ketal compounds such as acetophenone dimethylketal, and benzyl dimethylketal; benzophenone compounds such as benzophenone, methylbenzophenone, 4,4'-dichlorobenzophenone, 4,4'-bis-diethylaminobenzophenone, Michler's ketone, and 4-benzoyl-4'-methyldiphenylsulfide; and 2,4,6-trimethylbenzoyldiphenylphosphine oxide. Incidentally, a radical polymerization initiator may be used singly or two or more radical polymerization initiators may be used in combination. The radical polymerization initiator used is not limited to these specific examples.

[Cationic Polymerization Initiator]

A compound for activating a polymerization reaction of the cationic polymerizable material containing a cationic polymerizable monomer and/or oligomer using light is used as the cationic polymerization initiator in the invention. Specific examples of the cationic polymerization initiator include diazonium salt, iodonium salt, sulfonium salt, selenium salt, pyridinium salt, ferrocenium salt, phosphonium salt, thiopyrinium salt. In particular, an onium salt photo-polymerization initiator that is relatively thermally stable, such as aromatic iodonium salt or aromatic sulfonium salt, may be preferably used. Examples of the aromatic iodonium salt include diphenyliodonium, ditolyliodonium, phenyl(p-anisyl)iodonium, bis(p-t-butylphenyl)iodonium, and bis(p-chlorophenyl)iodonium. Examples of the aromatic sulfonium salt include diphenylsulfonium, ditolylsulfonium, phenyl(p-anisyl)sulfonium, bis(p-t-butylphenyl)sulfonium, and bis(p-chlorophenyl)sulfonium. When the onium salt photo-polymerization initiator such as aromatic iodonium salt or aromatic sulfonium salt is used, anions are $BF_4^-$, $AsF_6^-$, $SbF_6^-$, $PF_6^-$, $B(C_6F_5)_4^-$, etc. Incidentally, a cationic polymerization initiator may be used singly or two or more kinds of cationic polymerization initiators may be used in combination. The cationic polymerization initiator used is not limited to these specific examples.

EXAMPLE 1

Figure 1:
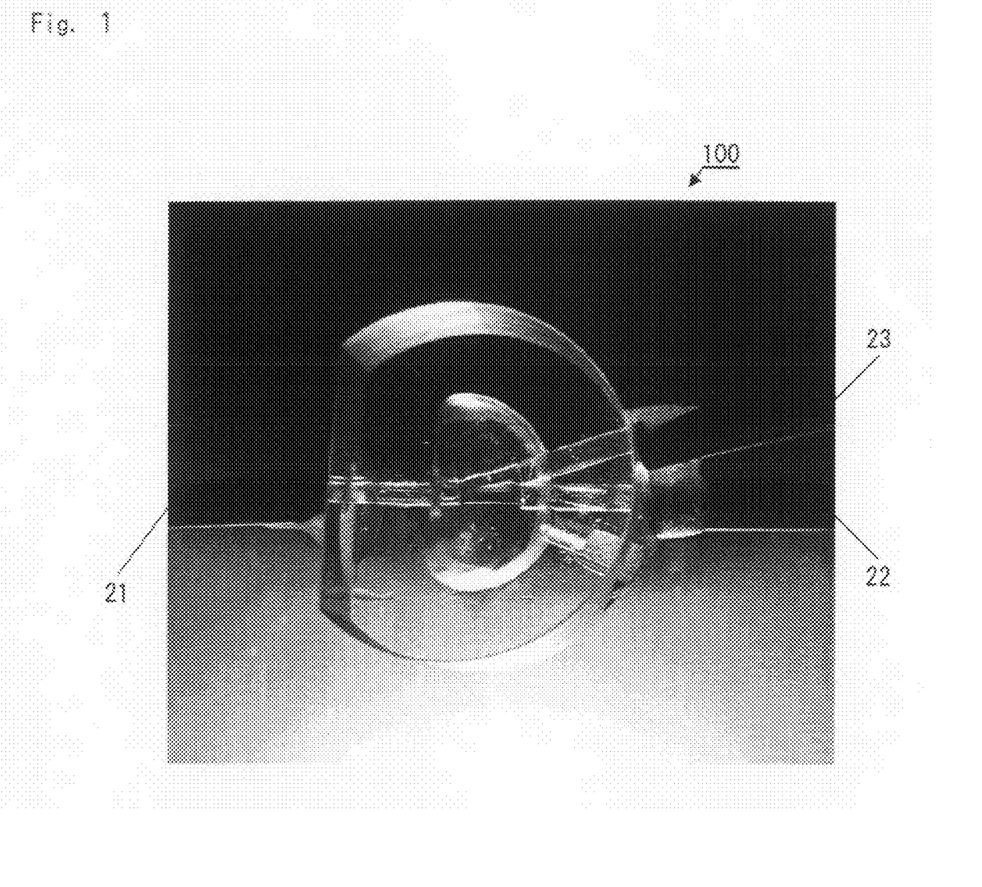
FIG. 1 is a photograph of the optical branching-coupling device 100 according to Example 1 of the present invention.
Figure 2:
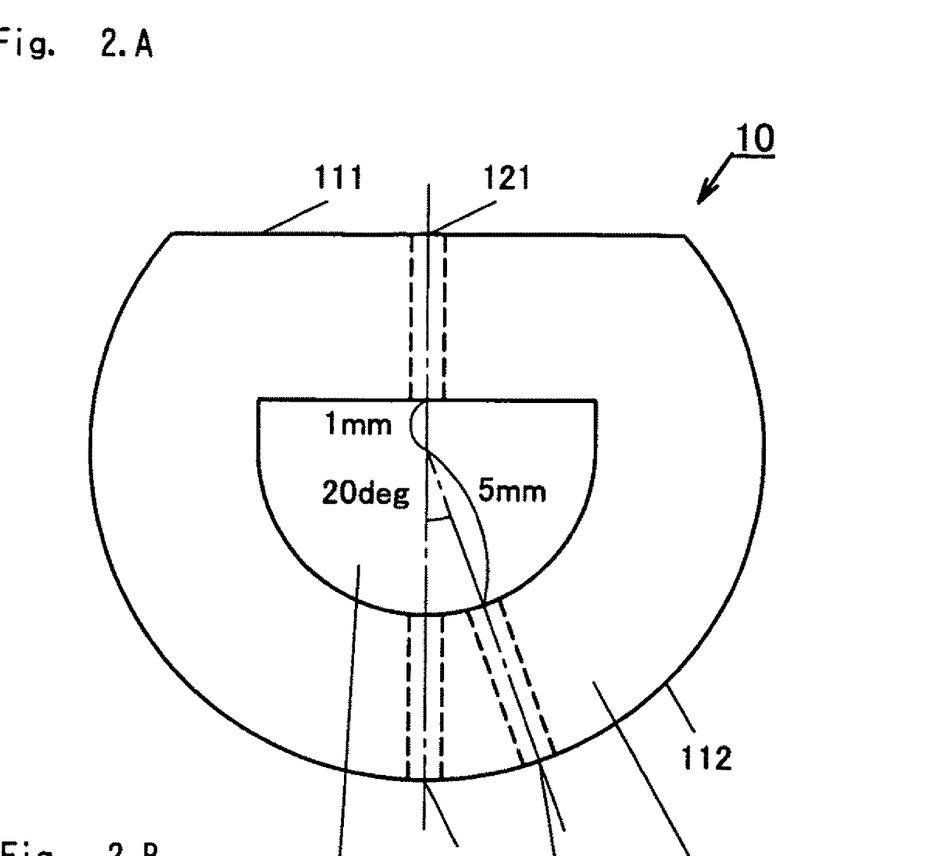
FIG. 2A is a plan view of the housing 10 used in the optical branching-coupling device 100.
FIG. 2B is a front view of the housing 10 used in the optical branching-coupling device 100.

An optical branching-coupling device 100 according to the present invention was manufactured. FIG. 1 is a photograph thereof. The optical branching-coupling device 100 is an optical branching-coupling device having three plastic optical fibers (POFs) 21, 22, and 23. A housing 10 of the optical branching-coupling device 100 was manufactured in accordance with the design drawings of FIGS. 2A and 2B. FIGS. 2A and 2B are a plan view and a front view of the housing 10, respectively.

As FIGS. 2A and 2B show, the housing 10 has a D-shaped sidewall 11 and a bottom part 12, and an approximately semi-columnar region V having an open top part and being surrounded by the D-shaped side wall 11 and the bottom part 12. The housing 10 also has three optical fiber insertion holes 121, 122, and 123 in the D-shaped side wall 11 which are penetrating hole parts having a columnar side face. The optical fiber insertion hole 121, which is a penetrating hole part having a columnar side face, is formed penetrating from the planar rear part 111 of the sidewall 11 to the semi-columnar region V so that the central axis thereof is vertically directed from the planar rear part 111 of the sidewall 11 in the front-back direction. The optical fiber insertion hole 122, which is a penetrating hole part having a columnar side face, is formed penetrating from the semi-columnar front face part 112 of the sidewall 11 to the semi-columnar region V so that the central axis thereof is aligned with an extension of the central axis of the optical fiber insertion hole 121. In addition, the optical fiber insertion hole 123, which is a hole part having a columnar side face, is formed penetrating from the semi-columnar front face part 112 of the sidewall 11 to the semi-columnar region V so that an extension of the central axis and an extension of the central axis of optical fiber insertion hole 122 intersect at an angle of 20 degrees. The semicircle part of the bottom face of approximately semi-columnar region V has a radius of about 5 mm. The opening of the optical fiber insertion hole 121 which is formed at the side of the semi-columnar region V is positioned about 1 mm away from the central axis of the semi-columnar region V. The housing 10 is not necessarily formed of a transparent material. However, in order to view the inside easily, the housing 10 of the optical branching-coupling device 100 was manufactured of a transparent synthetic resin.

Figure 3:
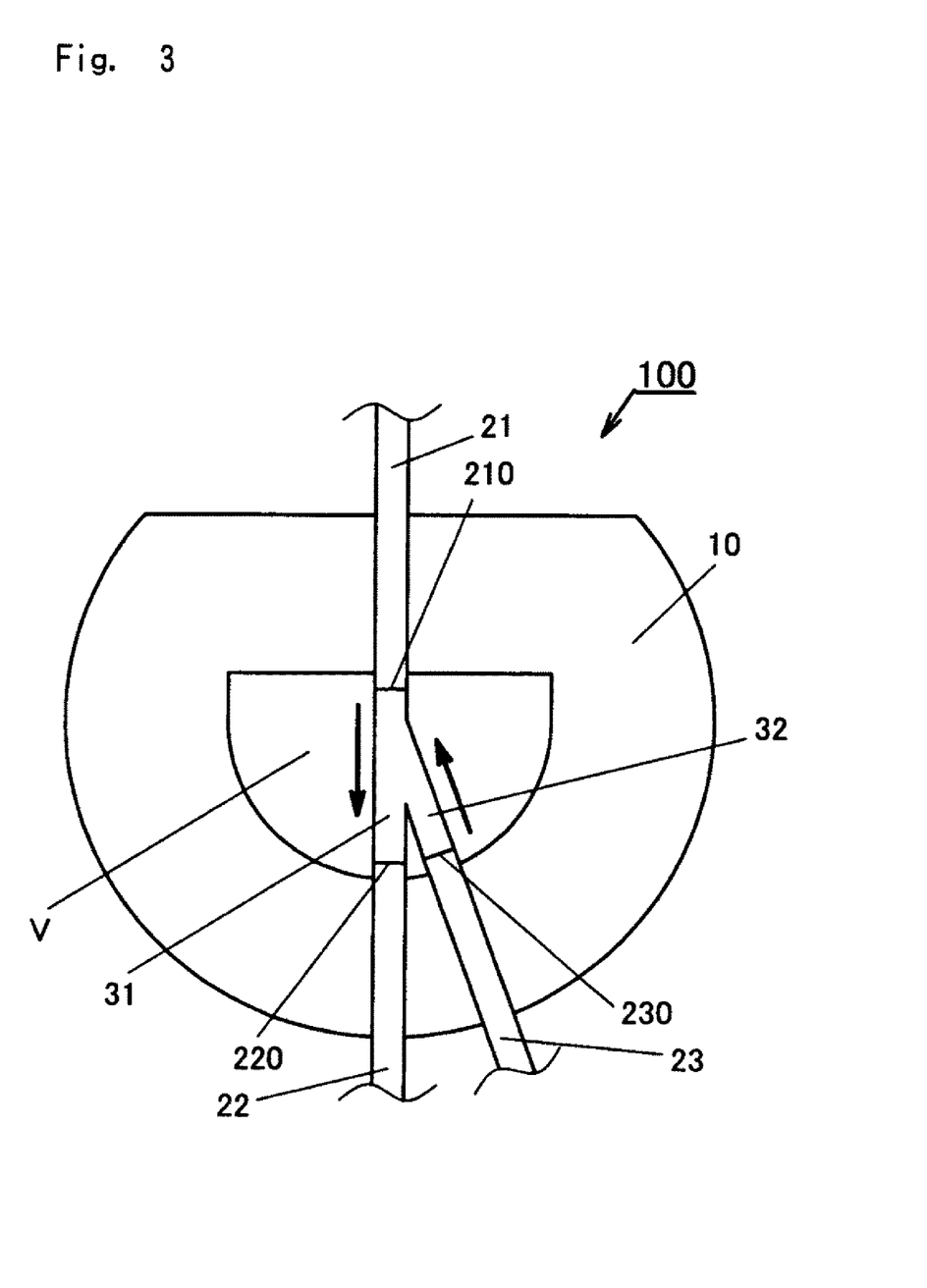
FIG. 3 is a cross-sectional (plan) view illustrating the structure of the optical branching-coupling device 100.

The optical branching-coupling device 100 of FIG. 1 was manufactured by the above-mentioned manufacturing technique of a self-written optical waveguide. The steps are illustrated with reference to the conceptual diagram of FIG. 3. FIG. 3 is a cross-sectional (plan) view illustrating the structure of the optical branching-coupling device 100. The arrows represent the growth direction of the cured material of a light-curing resin when the optical waveguide cores 31 and 32 are manufactured.

Specifically, the optical branching-coupling device 100 has the following structure, as shown in FIG. 3. Three plastic optical fibers (POFs) 21, 22, and 23 were inserted into the optical fiber insertion holes 121, 122, and 123 of the housing 10 having an approximately D-shaped sidewall part as shown in FIG. 2A. The end faces 210, 220, and 230 of the POFs 21, 22, and 23 are exposed cores, which sequentially correspond to the first, second, and third optical input-output ports as claimed herein.

Next, the approximately semi-columnar region V in the housing 10 was filled with an uncured liquid light-curing acrylic resin. The resin was mixed with a photopolymerization initiator. Subsequently, a laser beam with a wavelength of about 408 nm was propagated in the POF 21, then was radiated from the end face 210 of the POF 21 to the liquid light-curing acrylic resin filled in the approximately semi-columnar region V, to form a cured material. The cured material was axial (columnar), and the diameter was equal to the core diameter of the POF 21. The cured material grew, resulting in the cured material reaching the end face 220 of the POF 22, thereby forming the optical waveguide core 31 with a length of about 4 mm, which optically connects the end face 210 of the POF 21 with the end face 220 of the POF 22.

Next, the laser beam of a wavelength of about 408 nm was radiated from the end face 230 of the POF 23 to the liquid light-curing acrylic resin filled in the approximately semi-columnar region V, to form a cured material. The cured material was axial (columnar), and the diameter was equal to the core diameter of the POF 23. The cured material grew, resulting in a connection with the optical waveguide core 31, thereby forming the optical waveguide core 32. Then, the uncured light-curing resin was discharged, and the surfaces of the cores were washed. Subsequently, the approximately semi-columnar region V of the housing 10 was filled with a liquid light-curing resin with a lower refractive index, and the liquid light-curing resin was irradiated with ultraviolet rays to form a cladding. The optical waveguide core 31 is the core of the first optical waveguide in the structure claimed herein, and the optical waveguide core 32 is the core of the second optical waveguide in the structure claimed herein.

Figure 4:
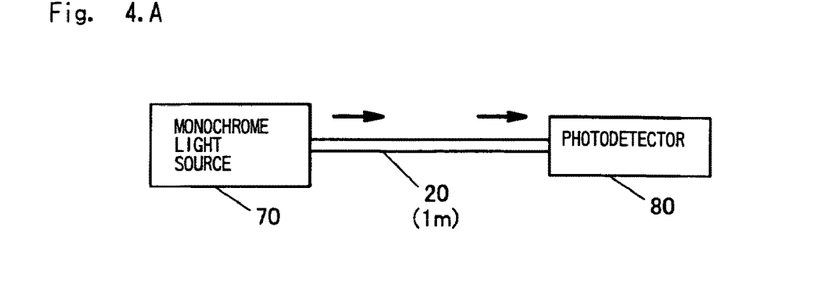
FIG. 4A is a schematic diagram at the time of measurement of the initial value in Example 1.
FIG. 4B is a schematic diagram at the time of measurement of the attenuation in Example 1.

The insertion loss of the optical branching-coupling device 100 shown in the photograph of FIG. 1 and the schematic diagram of FIG. 3 was measured. FIGS. 4A and 4B are the schematic diagrams illustrating the measuring method. As shown in FIG. 4A, a monochrome light source 70 with a wavelength of 650 nm was connected with the photodetector 80 through the POF 20 of a length of 1 m, and the value (light quantity) measured by the photodetector was defined as the initial value. Next, the monochrome light source 70 was connected with the photodetector 80 through the optical branching-coupling device 100, and the difference (attenuation) from the initial value of the value (light quantity) measured by the photodetector was measured. In this case, the attenuation values were measured in the two cases when the POF 21 of a length of 1 m from the optical branching-coupling device 100 was connected with the monochrome light source 70, and the POF 22 of a length of 1 m from the optical branching-coupling device 100 was connected with the photodetector 80 (FIG. 4B) and when the POF 23 of a length of 1 m from the optical branching-coupling device 100 was connected with the monochrome light source 70, and the POF 21 of a length of 1 m from the optical branching-coupling device 100 was connected with the photodetector. As a comparative example, the attenuation was measured when the half mirror for which both of the reflectivity and the transmissivity are 50% to light of a wavelength of 650 nm was placed at the branching part of the optical branching-coupling device shown in FIG. 6. The insertion loss of the optical branching-coupling device 100 according to Example 1 was 2.5 dB from the POF 21 to the POF 22 (the optical waveguide core 31) and 5 dB from the POF 23 (the optical waveguide 32) to the POF 21, which were excellent. Meanwhile, the insertion loss of the optical branching-coupling device with a half mirror according to the comparative example was 6 dB. Thus, according to the present invention, the optical branching-coupling device with the length of 4 mm and the insertion loss of 2.5 dB between the first and second optical input-output ports, which are extremely small, can be formed. In this case, the insertion loss in the light propagation from the third optical input-output port to the first the optical input-output port was 5 dB, which was small, compared with that for the optical branching-coupling device having a half mirror.

EXAMPLE 2

Figure 5:
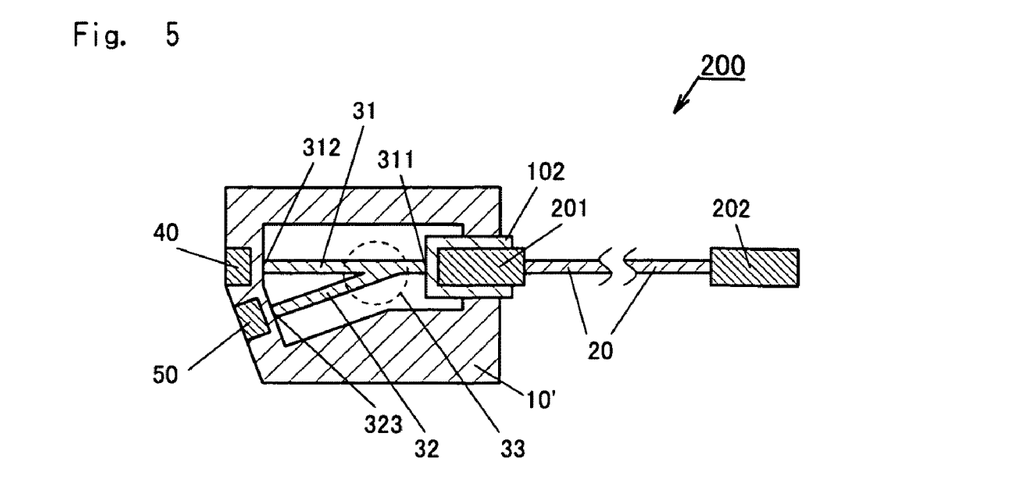
FIG. 5 is a plan view illustrating the structure of the optical module 200 according to Example 2 of the present invention.

FIG. 5 is a plan view illustrating the structure of an optical module 200 according to the present invention. The optical module 200 of FIG. 5 has a transparent housing 10', and a first optical waveguide core 31 and a second optical waveguide core 32 which form the branch part 33 without using half mirrors in the transparent housing. Both the cores of the first optical waveguides 31 and the second optical waveguide 32 consist of a cured material of a light-curing resin, which is manufactured by a manufacturing technique of a self-written optical waveguide. The optical module 200 further includes a receptacle 102 optically connected with a first optical input-output port 311 which is the end face of the first optical waveguide core 31; a PD 40 optically connected with a second optical input-output port 312 which is the end face of the first optical waveguide core 31 through the transparent housing 10'; and an LED 50 optically connected with a third optical input-output port 323 which is the end face of the second optical waveguide core 32 through the transparent housing 10'. The receptacle 102 of the optical module 200 of FIG. 5 can be connected with a POF 20 by using a corresponding connector 201. As described above, the optical module 200 according to the present invention is extremely small in size and in insertion loss. In addition, since the optical module 200 has no half mirrors, the possibility of detachment of the core consisting of a cured material of a light-curing resin with the lapse of time is smaller than that of an optical module having a half mirror.

The present invention is useful as an input-output port module of an optical communication line. In particular, it is useful for a single wire bidirectional optical LAN.

What is claimed is:

1. A method of producing an optical branching-coupling device, the optical branching-coupling device including a housing having a region configured to form optical waveguide cores and cladding, first, second, and third optical input-output ports formed on a sidewall of the housing, a first optical waveguide having a straight optical axis connecting the first optical input-output port and the second optical input-output port, and a second optical waveguide having a straight optical axis directly connected to the first optical waveguide and connecting the first optical waveguide and the third optical input-output port, an angle between the straight optical axes of the first optical waveguide and the second optical waveguide being in a range from 10° to 30°, the method comprising:

disposing an edge of cores of a first optical fiber at the first optical input-output port;

disposing an edge of cores of a second optical fiber at the third optical input-output port;

disposing an uncured core liquid light-curing resin in the region of the housing;

forming a core of the first optical waveguide by radiating curing light of a wavelength capable of curing the uncured core liquid light-curing resin from the first optical input-output port to the second optical input-output port by the first optical fiber;

forming a core of the second optical waveguide after the forming of the core of the first optical waveguide so as to be directly connected with the core of the first optical waveguide by radiating curing light of a wavelength capable of curing the uncured core liquid light-curing resin from the third optical input-output port by the second optical fiber, at an angle in a range from 10° to 30° relative to the optical axis of the first optical waveguide; and     forming the cladding by curing cladding curing resin to surround the cores of the first and second optical waveguides, the cladding curing resin having a refractive index that is less than a refractive index of the core liquid light-curing resin.

2. The method of producing the optical branching-coupling device according to claim 1, further comprising:

disposing an edge of cores of a third optical fiber at the second optical input-output port; and     forming a core of the first optical waveguide by radiating curing light of a wavelength capable of curing the uncured core liquid light-curing resin from the second optical input-output port to the first optical input-output port by the third optical fiber.

3. The method of producing the optical branching-coupling device according to claim 1, wherein the cores of the first and second optical waveguide consist of a cured material of the uncured core liquid light-curing resin.

4. The method of producing the optical branching-coupling device according to claim 1, further comprising:

discharging a remaining amount of the uncured core liquid light-curing resin from the region of the housing after the forming of the cores of the first and the second optical waveguides;

washing surfaces of the cores;

filling the region of the housing with the cladding curing resin, the cladding curing resin comprising a cladding liquid light-curing resin; and     irradiating the cladding liquid light-curing resin with ultraviolet rays to form the cladding.

5. A method of producing an optical branching-coupling device, the optical branching-coupling device including a housing having a region configured to form optical waveguide cores and cladding, first, second, and third optical input-output ports formed on a sidewall of the housing, a first optical waveguide with a straight optical axis connecting the second optical input-output port and the first optical input-output port, and a second optical waveguide with a straight optical axis directly connected to the first optical waveguide and connecting the first optical waveguide and the third optical input-output port, an angle between the straight optical axes of the first optical waveguide and the second optical waveguide being in a range from 10° to 30°, the method comprising:

disposing an edge of cores of a third optical fiber at the second optical input-output port;

disposing an edge of cores of a second optical fiber at the third optical input-output port;

disposing an uncured core liquid light-curing resin in the region of the housing;

forming a core of the first optical waveguide by radiating curing light of a wavelength capable of curing the uncured core liquid light-curing resin from the second optical input-output port to the first optical input-output port by the third optical fiber;

forming a core of the second optical waveguide after the forming the core of the first optical waveguide so as to be directly connected with the core of the first optical waveguide by radiating curing light of a wavelength capable of curing the uncured core liquid light-curing resin from the third optical input-output port by the second optical fiber, at an angle in a range from 10° to 30° relative to the optical axis of the designed first optical waveguide; and     forming the cladding by curing cladding curing resin to surround the cores of the first and second optical waveguides, the cladding curing resin having a refractive index that is less than a refractive index of the core liquid light-curing resin.

6. The method of producing the optical branching-coupling device according to claim 5, wherein the cores of the first and second optical waveguide consist of a cured material of the uncured core liquid light-curing resin.

7. The method of producing the optical branching-coupling device according to claim 5, further comprising:

discharging a remaining amount of the uncured core liquid light-curing resin from the region of the housing after the forming of the cores of the first and the second optical waveguides;

washing surfaces of the cores;

filling the region of the housing with the cladding curing resin, the cladding curing resin comprising a cladding liquid light-curing resin; and     irradiating the cladding liquid light-curing resin with ultraviolet rays to form the cladding.

8. A method of producing an optical branching-coupling device, the method comprising:

disposing an edge of cores of a first optical fiber at a first optical input-output port formed on a sidewall of a housing, the housing including a region configured to form optical waveguide cores and cladding;

disposing an edge of cores of a second optical fiber at a third optical input-output port formed on the sidewall of the housing;

disposing an uncured core liquid light-curing resin in the region of the housing;

forming a core of a first optical waveguide by radiating curing light of a wavelength capable of curing the uncured core liquid light-curing resin from the first optical input-output port to a second optical input-output port by the first optical fiber, the first optical waveguide having a straight optical axis connecting the first optical input-output port and the second optical input-output port, the second optical input-output port being formed on the sidewall of the housing;

forming a core of a second optical waveguide after the forming of the core of the first optical waveguide so as to be directly connected with the core of the first optical waveguide by radiating curing light of a wavelength capable of curing the uncured core liquid light-curing resin from the third optical input-output port by the second optical fiber, at an angle in a range from 10° to 30° relative to the optical axis of the first optical waveguide, the second optical waveguide having a straight optical axis directly connected to the first optical waveguide and connecting the first optical waveguide and the third optical input-output port, an angle between the respective straight optical axes of the first optical waveguide and the second optical waveguide being in a range from 10° to 30°; and forming the cladding by curing cladding curing resin to surround the cores of the first and second optical waveguides, the cladding curing resin having a refractive index that is less than a refractive index of the core liquid light-curing resin.

* * * * *